(12) United States Patent
Muraki et al.

(10) Patent No.: US 12,725,633 B2
(45) Date of Patent: Sep. 1, 2026

(54) MULTI-LAYER LOAD BEAM FLEXURE FOR MAGNETIC STORAGE DEVICE

(71) Applicant: Western Digital Technologies, Inc., San Jose, CA (US)

(72) Inventors: Takuma Muraki, Yamato (JP); Yoshinobu Noguchi, Yokohama (JP); Eiji Soga, Chigasaki (JP); Hiroyasu Tsuchida, Fujisawa (JP)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 19/049,145

(22) Filed: Feb. 10, 2025

(65) Prior Publication Data

US 2025/0182783 A1 Jun. 5, 2025

Related U.S. Application Data

(62) Division of application No. 18/359,753, filed on Jul. 26, 2023, now Pat. No. 12,272,387.

(60) Provisional application No. 63/445,219, filed on Feb. 13, 2023.

(51) Int. Cl.
*G11B 5/48* (2006.01)

(52) U.S. Cl.
CPC .......... *G11B 5/4833* (2013.01); *G11B 5/4826* (2013.01)

(58) Field of Classification Search
None
See application file for complete search history.

(56) References Cited

U.S. PATENT DOCUMENTS 4,996,623 A 2/1991 Erpelding
5,187,625 A 2/1993 Blaeser
5,839,193 A * 11/1998 Bennin ................ G11B 5/4833 216/13
5,862,010 A * 1/1999 Simmons ............... G11B 21/00
5,955,176 A * 9/1999 Erpelding ................ H05K 1/09 428/209
6,215,622 B1 4/2001 Ruiz
6,721,133 B2 4/2004 Takagi
6,731,466 B2 5/2004 Arya
(Continued)

OTHER PUBLICATIONS

Chen et al., Damped leaf flexure hinge, Review of Scientific Instruments, 2015, pp. 1-7, vol. 86, AIP Publishing LLC, downloaded from https://www.researchgate.net/publication/276535581_Damped_leaf_flexure_hinge/link/56351e8c08aeb786b702c3dd/download on Feb. 13, 2023.

*Primary Examiner* — William J Klimowicz
(74) *Attorney, Agent, or Firm* — Massey Bean & Lewis

(57) ABSTRACT

A suspension assembly for a magnetic storage device. The suspension assembly includes a base plate, a load beam, and a flexure. A hinge of the load beam is configured to flex so that a distal end portion of the load beam moves relative to the base plate. The flexure includes a hinge portion and fixed portions adjacent the hinge portion. Each one of the fixed portions of the flexure includes a first layer and a second layer. The first layer is interposed between the second layer and the load beam. The hinge portion of the flexure includes the second layer but does not include the first layer. A thickness of the second layer of the hinge portion of the flexure is less than a thickness of the second layers of the fixed portions of the flexure.

20 Claims, 9 Drawing Sheets

(56) References Cited

U.S. PATENT DOCUMENTS

| | | | | |
|---|---|---|---|---|
| 6,731,472 | B2 | 5/2004 | Okamoto | |
| 7,088,553 | B2 | 8/2006 | Arya | |
| 7,420,778 | B2 | 9/2008 | Sassine | |
| 7,531,753 | B2 | 5/2009 | Funada | |
| 7,636,221 | B2 | 12/2009 | Watadani | |
| 7,898,770 | B1 | 3/2011 | Zhang | |
| 9,047,895 | B2 | 6/2015 | Yamaguchi | |
| 9,761,256 | B2 | 9/2017 | Kawao | |
| 9,804,496 | B2 | 10/2017 | Yamaguchi | |
| 2002/0080527 | A1 | 6/2002 | Shiraishi | |
| 2003/0007289 | A1* | 1/2003 | Shiraishi | G11B 5/4833 428/209 |
| 2003/0202283 | A1 | 10/2003 | Arya | |
| 2004/0061975 | A1 | 4/2004 | Boutaghou | |
| 2004/0150918 | A1 | 8/2004 | Murakami | |
| 2007/0115591 | A1 | 5/2007 | Yao | |
| 2007/0223144 | A1 | 9/2007 | Yao | |

* cited by examiner

MULTI-LAYER LOAD BEAM FLEXURE FOR MAGNETIC STORAGE DEVICE

FIELD

This disclosure relates generally to magnetic storage devices, and more particularly to multi-layer load beam flexures for magnetic storage devices.

BACKGROUND

Magnetic storage devices, such as hard disk drives ("HDDs"), are widely used to store digital data or electronic information for enterprise data processing systems, computer workstations, portable computing devices, digital audio players, digital video players, and the like. Generally, HDDs include read-write heads that help facilitate storage of data on magnetic disks. Each read-write head is supported on a suspension assembly. Some HDDs include a suspension assembly with a flexure.

SUMMARY

A need exists for a magnetic storage device and a method of manufacture that reduce shifts in separation between a read/write head of the suspension assembly of the magnetic storage device and the disk that it is reading data from or writing data to. The subject matter of the present application has been developed in response to the present state of magnetic storage devices, and in particular, in response to problems and needs in the art, such as those discussed above, that have not yet been fully solved by currently available magnetic storage devices. Accordingly, the examples of the present disclosure overcome at least some of the shortcomings of the prior art.

The following is a non-exhaustive list of examples, which may or may not be claimed, of the subject matter, disclosed herein.

Disclosed herein is a suspension assembly for a magnetic storage device. The suspension assembly has a base plate and a load beam attached to the base plate. The load beam includes a distal end portion and a hinge. The hinge is interposed between the distal end portion and the base plate and is configured to flex so that the distal end portion moves relative to the base plate. The suspension assembly includes a flexure attached to and co-movable with the base plate and the load beam. The flexure has a hinge portion, which spans the hinge of the load beam, and fixed portions adjacent to the hinge portion. Each one of the fixed portions of the flexure has a first layer and a second layer. The first layer is interposed between the second layer and the load beam. The hinge portion of the flexure includes the second layer but does not include the first layer such that a gap, which spans the hinge, is defined between the first layers of the fixed portions of the flexure. A thickness of the second layer of the hinge portion of the flexure is less than a thickness of the second layers of the fixed portions of the flexure. The preceding subject matter of this paragraph characterizes example 1 of the present disclosure.

A ratio of a thickness of a first portion of the second layer to a thickness of a second portion of the second layer is greater than 1 and no more than 2.4. The preceding subject matter of this paragraph characterizes example 2 of the present disclosure, wherein example 2 also includes the subject matter according to example 1, above.

The load beam is made of metallic material. The preceding subject matter of this paragraph characterizes example 3 of the present disclosure, wherein example 3 also includes the subject matter according to any one of examples 1-2, above.

The first layer is made of a metallic material. The preceding subject matter of this paragraph characterizes example 4 of the present disclosure, wherein example 4 also includes the subject matter according to any one of examples 1-3, above.

The first layer is positioned directly above the load beam. The preceding subject matter of this paragraph characterizes example 4 of the present disclosure, wherein example 5 also includes the subject matter according to any one of examples 1-4, above.

Each one of the fixed portions of the flexure has a third layer. The preceding subject matter of this paragraph characterizes example 4 of the present disclosure, wherein example 6 also includes the subject matter according to any one of examples 1-5, above.

The second layer is interposed between the first layer and the third layer. The preceding subject matter of this paragraph characterizes example 7 of the present disclosure, wherein example 7 also includes the subject matter according to example 6, above.

The third layer is of a substantially uniform thickness. The preceding subject matter of this paragraph characterizes example 8 of the present disclosure, wherein example 8 also includes the subject matter according to any one of examples 6-7, above.

The third layer is made of copper. The preceding subject matter of this paragraph characterizes example 9 of the present disclosure, wherein example 9 also includes the subject matter according to any one of examples 6-8, above.

The first layer, second layer, and third layer are arranged in a stacked formation. The preceding subject matter of this paragraph characterizes example 10 of the present disclosure, wherein example 10 also includes the subject matter according to any one of examples 6-9, above.

The second layer is made of a photosensitive polyimide material. The preceding subject matter of this paragraph characterizes example 11 of the present disclosure, wherein example 11 also includes the subject matter according to any one of examples 1-10, above.

The second layer is made of a dielectric material. The preceding subject matter of this paragraph characterizes example 12 of the present disclosure, wherein example 12 also includes the subject matter according any one of examples 1-11, above.

Disclosed herein is a magnetic storage system. The magnetic storage system includes a base plate, a quantity of disks, and a carriage arm. The carriage arm includes a load beam attached to the base plate. The load beam includes a distal end portion, a hinge, and a flexure. The hinge is interposed between the distal end portion and the base plate and is configured to flex so that the distal end portion moves relative to the base plate. The flexure is attached to and co-movable with the base plate and the load beam. The flexure comprises a hinge portion, which spans the hinge of the load beam and fixed portions adjacent to the hinge portion. Each one of the fixed portions of the flexure includes a first layer and a second layer. The first layer is interposed between the second layer and the load beam. The hinge portion of the flexure includes the second layer but does not include the first layer, such that the gap, which spans the hinge, is defined between the first layers of the fixed portions of the flexure. A thickness of the second layer of the hinge portion of the flexure is less than a thickness of the second layers of the fixed portions of the flexure. The preceding subject matter of this paragraph characterizes example 13 of the present disclosure.

A ratio of a thickness of a first portion of the second layer to a thickness of a second portion of the second layer is greater than 1 and no more than 2.4. The preceding subject matter of this paragraph characterizes example 14 of the present disclosure, wherein example 14 also includes the subject matter according to example 13, above.

The hinge biases towards a surface of at least one disc of the quantity of discs to allow a head of the distal end portion to read data from or write data to the at least one disc. The preceding subject matter of this paragraph characterizes example 15 of the present disclosure, wherein example 15 also includes the subject matter according to any one of examples 13-14, above.

Also disclosed herein is a method of manufacturing a suspension assembly of a magnetic storage device. The method includes forming a second layer onto a first layer. The method also includes applying a mask onto the second layer. A translucency of a first portion of the mask differs from a translucency of a second portion of the mask. The method also includes irradiating light through the first portion and the second portion of the mask. The method also includes removing the mask from the second layer and etching the second layer so that a first portion of the second layer, onto which the first portion of the mask is applied, has a first thickness, and a second portion of the second layer, onto which the second portion of the mask is applied, has a second thickness, wherein the second thickness is less than the first thickness. The preceding subject matter of this paragraph characterizes example 16 of the present disclosure.

Disclosed herein is a method of manufacturing a suspension assembly of a magnetic storage device. The method includes forming a third layer onto the second layer after forming a fourth layer above the second layer and a fifth layer below the first layer by etching at least on portion of the fourth layer. The method also includes removing the fourth layer and the fifth layer through a chemical wash, forming a sixth layer onto the third layer, forming a seventh layer below the first layer, and removing a portion of the first layer and a portion of the seventh layer. Each removed portion is aligned with the second portion of the mask. The method also includes removing the sixth layer and the seventh layer. The preceding subject matter of this paragraph characterizes example 17 of the present disclosure, wherein example 17 also includes the subject matter according to example 16, above.

A portion of the mask includes a halftone glass mask. The preceding subject matter of this paragraph characterizes example 18 of the present disclosure, wherein example 18 also includes the subject matter according to any one of examples 16-17, above.

The first layer is made of stainless steel. The second layer is made of a polyimide material. The third layer is made of copper. Each of the fourth, fifth, sixth, and seventh layers are made of dry film photoresist. The preceding subject matter of this paragraph characterizes example 19 of the present disclosure, wherein example 19 also includes the subject matter according to any one of examples 16-18, above.

A method of manufacturing a suspension assembly of a magnetic storage device includes affixing the flexure to a base plate and a load beam such that the second portion of the second layer spans a hinge portion of the load beam. The preceding subject matter of this paragraph characterizes example 20 of the present disclosure, wherein example 20 also includes the subject matter according to any one of examples 16-19, above.

The described features, structures, advantages, and/or characteristics of the subject matter of the present disclosure may be combined in any suitable manner in one or more examples and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example or implementation. In other instances, additional features and advantages may be recognized in certain examples and/or implementations that may not be present in all examples or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the disclosure will be readily understood, a more particular description of the disclosure briefly described above will be rendered by reference to specific examples that are illustrated in the appended drawings. Understanding that these drawings depict only typical examples of the disclosure and are not therefore to be considered to be limiting of its scope, the subject matter of the present application will be described and explained with additional specificity and detail through the use of the accompanying drawings, in which.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

Figures 1, 2:
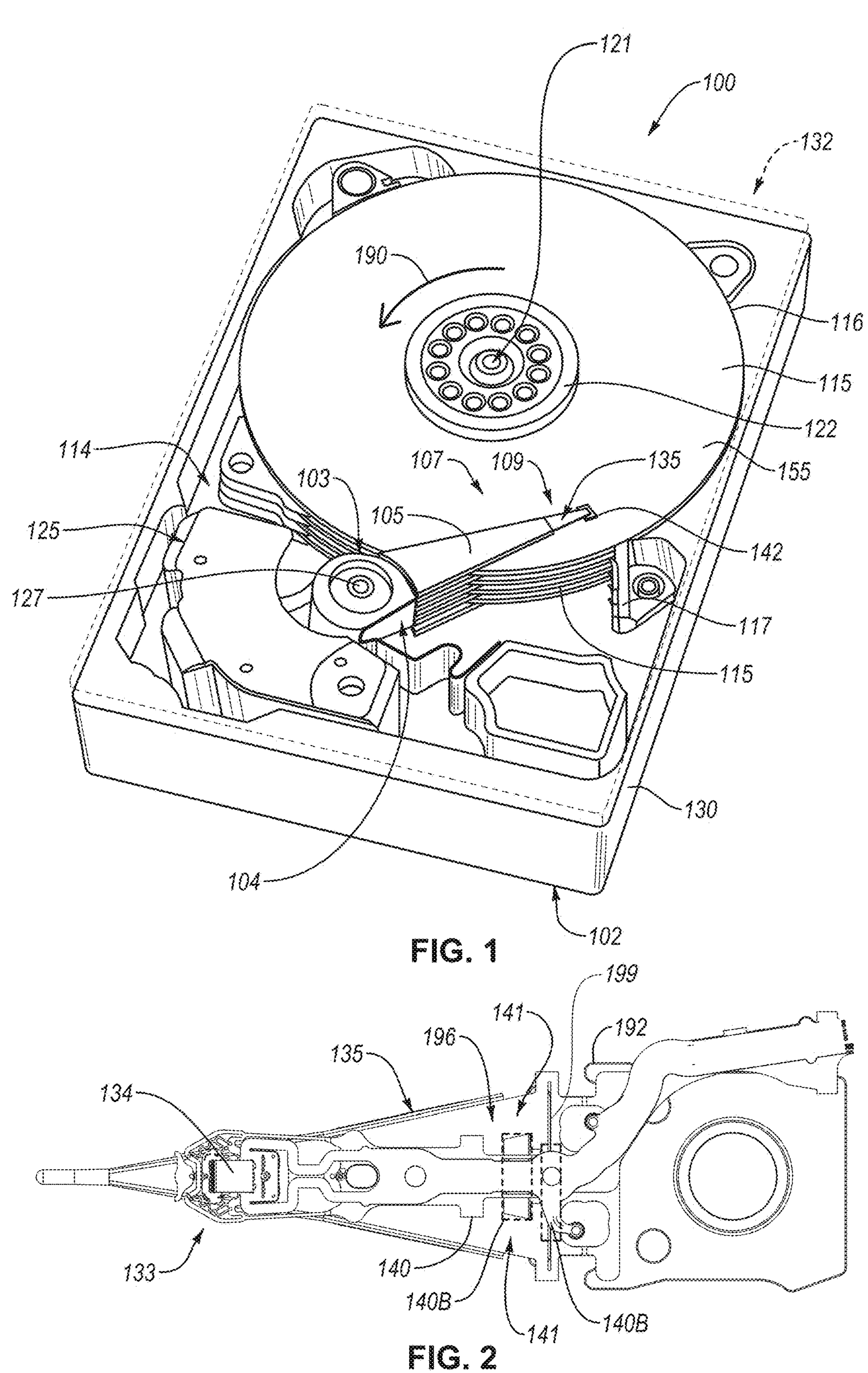
FIG. 1 is a schematic perspective view of a magnetic storage device, according to one or more examples of the present disclosure.
FIG. 2 is a schematic bottom plan view of a suspension assembly of a magnetic storage device, according to one or more examples of the present disclosure.

Referring to FIG. 1, a magnetic storage device 100, according to one example, is depicted as a hard disk drive (HDD). However, in other examples, the magnetic storage device 100 can be any of various magnetic storage devices without departing from the essence of the subject matter of the present disclosure. The magnetic storage device 100 includes a housing 102 that seals or encloses an interior cavity 114 defined within the housing. The housing 102 includes a base 130 and a cover 132 (shown in dashed lines so as not to obscure internal features of the magnetic storage device 100 within the interior cavity 114 of the housing 102). The cover 132 is coupled to the base 130 to enclose the interior cavity 114 from the environment exterior to the housing 102. In some implementations, a seal or gasket is positioned between the base 130 and the cover 132 to promote a seal between the base 130 and the cover 132. In some examples, the base 130 is made of a metallic material, such as stainless steel.

The magnetic storage device 100 includes various features located within the interior cavity 114 of the housing 102. In some examples, the magnetic storage device 100 includes a carriage 103, disks 115, a spindle motor 121, and a voice coil motor (VCM) 125 within the interior cavity 114. The carriage 103 includes a head stack assembly 107 that includes a plurality of carriage arms 105 and at least one head-gimbal assembly 109 (e.g., suspension) coupled to the distal tip of each carriage arm of the plurality of carriage arms 105. Each head-gimbal assembly 109 includes a suspension assembly 135 and a slider 142. The slider 142 includes at least one read-write head coupled to (e.g., embedded in) the slider 142. Although the magnetic storage device 100 in FIG. 1 is shown to have five carriage arms 105 and four disks 115, in other examples, the magnetic storage device 100 can have fewer or more than five carriage arms 105 or fewer or more than four disks 115. In one example, each side of each carriage arm 105 facing a disk 115 has a head-gimbal assembly 109 (e.g., each of bottom and top carriage arms 105 can have one head-gimbal assembly 109 and each of middle carriage arms 105, between the bottom and top carriage arms 105, can have two head-gimbal assemblies 109). Similarly, although the magnetic storage device 100 is shown to have one spindle motor 121 and one VCM 125, in other examples, the magnetic storage device 100 can have any number of spindle motors 121 and VCMs 125.

The spindle motor 121 is coupled to the base 130. Generally, the spindle motor 121 includes a stationary portion non-movably fixed relative to the base 130 and a spindle that is rotatable relative to the stationary portion and the base 130. Accordingly, the spindle of the spindle motor 121 can be considered to be part of or integral with the spindle motor. Generally, the spindle motor 121 is operable to rotate the spindle relative to the base 130. The disks 115, or platters, are co-rotatably fixed to the spindle of the spindle motor 121 via respective hubs 122, which are co-rotatably secured to respective disks 115 and the spindle. As the spindle of the spindle motor 121 rotates, the disks 115 correspondingly rotate. In this manner, the spindle of the spindle motor 121 defines a rotational axis of each disk 115. The spindle motor 121 can be operatively controlled to rotate the disks 115, in a rotational direction 190, a controlled amount at a controlled rate.

Each one of the disks 115 may be any of various types of magnetic recording media. Generally, in one example, each disk 115 includes a substrate and a magnetic material applied directly or indirectly onto the substrate. For example, the magnetic material of the disks 115 may be conventional granular magnetic recording disks or wafers that have magnetic layer bits with multiple magnetic grains on each bit. In granular magnetic media, all of the bits are co-planar and the surface 116 of the disk is substantially smooth and continuous. In one example, each bit has a magnetic dipole moment that can either have an in-plane (longitudinal) orientation or an out-of-plane (perpendicular) orientation.

As the disks 115 rotate in a read-write mode, the VCM 125 electromagnetically engages voice coils of the carriage arms 105 to rotate the carriage arms 105, and the head-gimbal assemblies 109, which are coupled to the carriage arms 105, relative to the disks 115 in a rotational direction along a plane parallel to read-write surfaces 155 of the disks 115. The carriage arms 105 can be rotated to position the read-write head of the head-gimbal assemblies 109 over a specified radial area of the read-write surface 155 of a corresponding disk 115 for read and/or write operations. The VCM 125 is fixed to the base 130 in engagement with the voice coils of the carriage arms 105, which are rotatably coupled to the base 130 via a spindle 127 extending through the carriage 103. Generally, the spindle 127 defines a rotational axis about which the carriage arms 105 rotate when actuated by the VCM 125.

The carriage arms 105 are non-movably fixed to (e.g., integrally formed as a one-piece unitary monolithic body with) and extend away from a base of the carriage 103 in a spaced-apart manner relative to each other. In some implementations, the carriage arms 105 are spaced an equidistance apart from each other and extend parallel relative to each other. A respective one of the disks 115 is positioned between adjacent carriage arms 105. In an idle mode (e.g., when read-write operations are not being performed), the VCM 125 is actuated to rotate the carriage arms 105, in a radially outward direction relative to the disks 15, such that the head-gimbal assemblies 109 are parked or unloaded onto a ramp support 117 secured to the base 130.

Each read-write head of the slider 142 includes at least one read transducer and at least one write transducer. The read transducer is configured to detect magnetic properties (e.g., magnetic bit patterns) of a disk 115 and convert the magnetic properties into an electrical signal. In contrast, the write transducer changes the magnetic properties of a disk 115 responsive to an electrical signal. For each head-gimbal assembly 109, the electrical signals are transmitted from and to the read-write head via electrical traces or lines formed in or coupled to the slider 142 and the flexure 140 (see, e.g., FIGS. 5-7). The electrical traces of the slider 142 and the flexure 140 are electrically interconnected to facilitate transmission of electrical signals between the read-write head and a flex connector 104 of the magnetic storage device 100, which is in communication with a control module of the magnetic storage device 100 (see, e.g., FIG. 1). The control module is configured to process the electrical signals and facilitate communication of the electrical signals between the magnetic storage device 100 and one or more external computing devices. Generally, the control module includes software, firmware, and/or hardware used to control operation of the various components of the magnetic storage device 100. The control module may include a printed circuit board on or in which the hardware is mounted. Solder weldments are utilized to electrically connect corresponding electrical contact pads (and corresponding electrical traces) of the slider 142 and the flexure 140.

Although not shown, in some implementations, the head-gimbal assembly 109 also includes a head actuator that is selectively operable to move the read-write head relative to the hinge portion 140B of the flexure 140.

FIG. 2 is an underside view of a suspension assembly 135 of a magnetic storage device 100, according to one or more examples of the present disclosure. In some examples of the present disclosure, the suspension assembly 135 includes a base plate 192 and a load beam 196 with a distal end 133, undersides of which are illustrated in FIG. 2. The base plate 192 spans between and couples together a distal end 133 of the carriage arm 105 and the load beam 196. The load beam 196 is coupled to and bends with respect to a base plate 192 of the suspension assembly 135, via a hinge 141 of the load beam 196. In some examples, the hinge 141 includes two hinges on either side of a gap 199 in the load beam 196. The hinge 141 biases the load beam 196 towards a surface 116 of at least one disk 115 of the quantity of disks 115 to allow a read-write head 134 of a distal end portion 133 of the carriage arm 105 to read data from and/or write data to the at least one disk of the quantity of disks 115. In some examples, the read-write head 134 floats above the surface 116.

In some examples, the load beam 196 is made of a metallic material. When bent, the hinge 141 works as a spring to generate force (referred to herein as "gram load") to move the head 134 of the load beam 196 towards the surface 116 into a position such that the flying height between surface 116 and the read/write head 134 is minimal. This is accomplished, for example, through forced air. A gap between the read-write head 134 and the disk 115 may be referred to herein as a "flying height" or "floating height." It is often preferable to minimize this gap and/or to stabilize it to maximize signal quality of data transmitted between the disk 115 and the read-write head 134. In some examples, the flying height is approximately equal to or less than five nanometers ("nm"). However, examples of the present disclosure are not so limited.

Figure 5A:
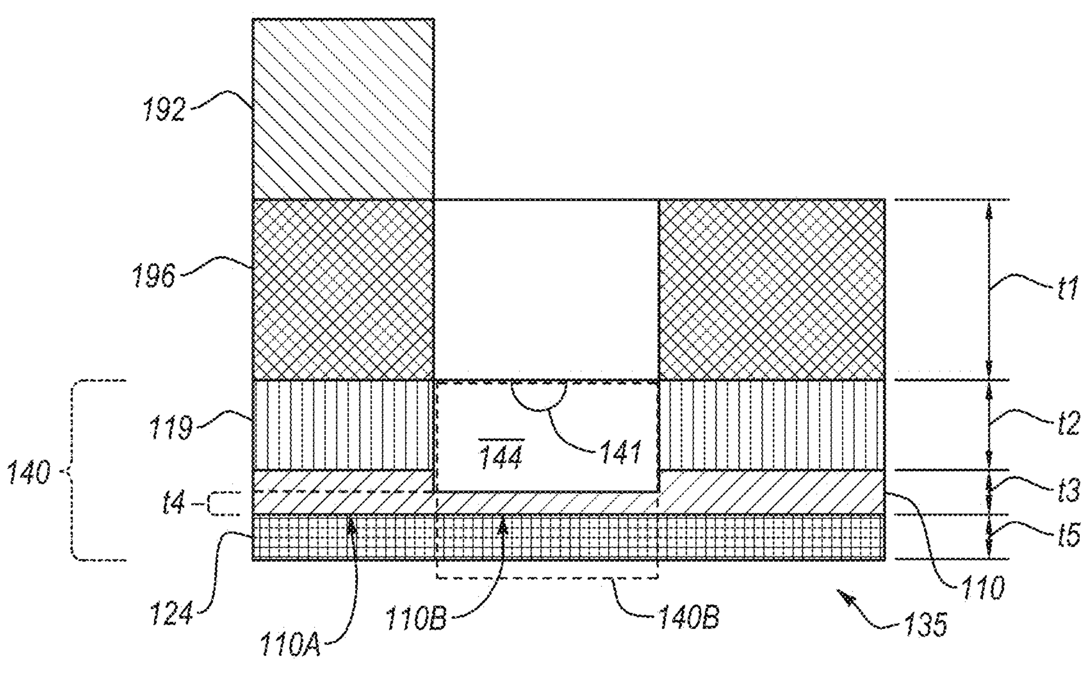
FIG. 5A is a schematic cross-sectional side elevation view of a suspension assembly of a magnetic storage device, according to one or more examples of the present disclosure.
Figure 5B:
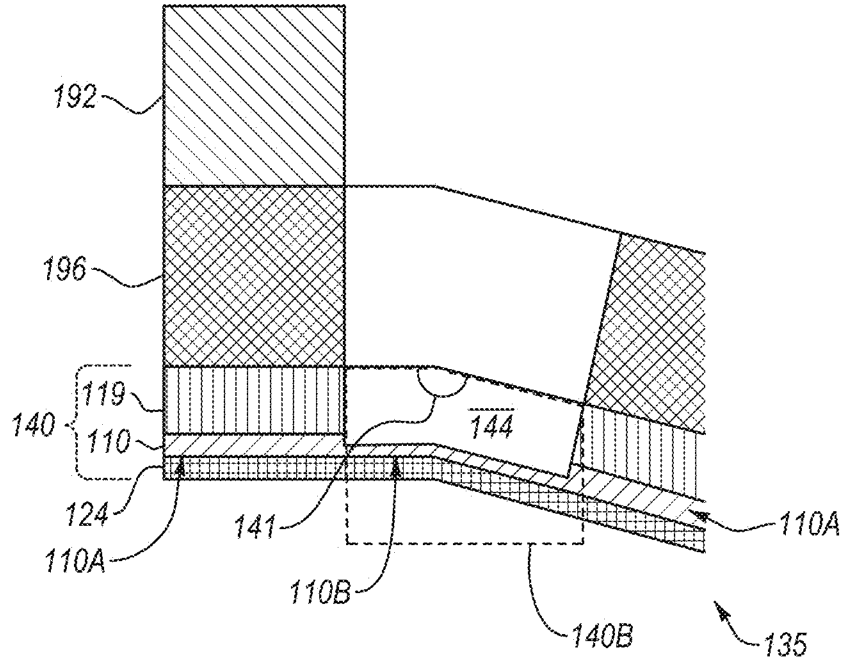
FIG. 5B is a schematic cross-sectional side elevation view of the suspension assembly of FIG. 5A, with a load beam and flexure bent around a hinge.

The suspension assembly 135 also includes a flexure 140 that extends along the undersides of the base plate 192 and the load beam 196. The flexure 140 includes a portion 140B that extends over (e.g., traverses) the hinge 141. Examples of the present disclosure include a reduced thickness of the flexure 140 at the hinge portion 140B of the flexure 140. As used herein, "hinge portion" of a feature refers to any portion of the feature that intersects and/or overlaps with the hinge 140. Hence, the hinge portion 140B of the flexure 140 is the portion of the flexure 140 approximately within the area shown in dashed line in FIG. 2. Correspondingly, the hinge portion 110B of a second layer 110 of the flexure 140 is the portion of the second layer 110 within the hinge portion 140B, as shown in FIGS. 5A and 5B.

The stiffness of the hinge 141 (i.e., stiffness in the hinge portion 140B of the flexure 140) will affect the flying height. If the hinge portion 140B is relatively stiff, the load beam 196 will not be able to position itself such that the flying height is minimized, because rotation around the hinge 141 will be restricted. Therefore, systems and methods of minimizing stiffness around the hinge 141 are beneficial. Additionally, stress on the hinge portion 140B leads to shifts in flying height. The gram load, or the reactionary force at the hinge 141 used to load the head 134 onto the surface 116 at the desired flying height, changes as a result of stress in the hinge area 140B (e.g., back-bending stress or heat stress). This leads to unwanted shifts in the flying height, ultimately affecting signal quality. In some instances, these shifts may be compensated by thermal flying height control ("TFC"). For example, TFC sliders such as slider 142 can control the flying height. However, shifts that are too large cannot be compensated through TFC. Therefore, in some examples, improving flying height control by reducing stress in the hinge portion 140B is preferable.

Figure 3:
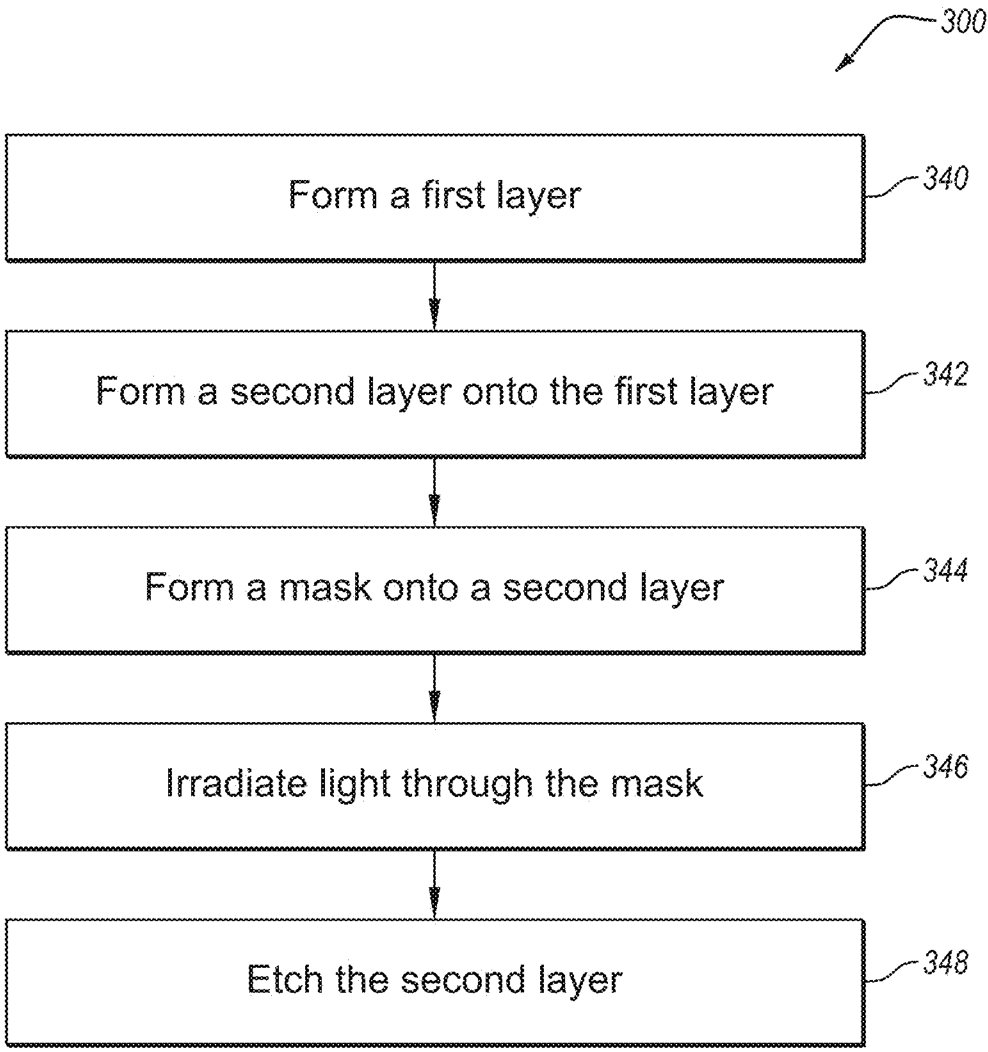
FIG. 3 is a flow chart of a method of manufacturing a suspension assembly of a magnetic storage device, according to one or more examples of the present disclosure.

FIG. 3 is a flow chart of a method 300 of manufacturing a suspension assembly 135 of a magnetic storage device 100, according to one or more examples of the present disclosure. Specifically, the method 300 includes manufacturing a flexure 140 of the suspension assembly 135 of the magnetic storage device 100. Some of the steps of the method 300, as well as additional steps of a method of forming a multi-layer flexure 140 in accordance with one or more examples of the present disclosure, are illustrated graphically in FIGS. 4A-O, which are cross-sectional views of a suspension assembly 135 of a magnetic storage device 100. Accordingly, some of the steps shown graphically in FIGS. 4A-O include the steps of the method 300 illustrated in FIG. 3. However, additional steps, besides those listed in FIG. 3, are shown graphically in FIGS. 4A-O. Those of skill in the art will appreciate that any combination of steps illustrated in FIGS. 3 and 4A-O, and/or described herein, may be employed.

Figure 4A:
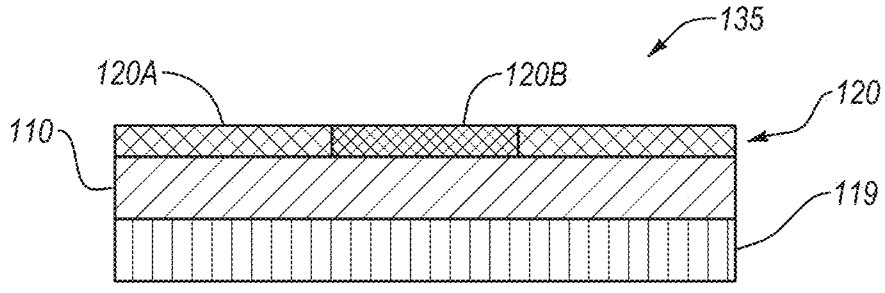
FIGS. 4A-O are schematic cross-sectional side elevation views of a suspension assembly of a magnetic storage device at various stages of manufacturing a multi-layer flexure of the suspension assembly of the magnetic storage device, according to one or more examples of the present disclosure.
Figure 4B:
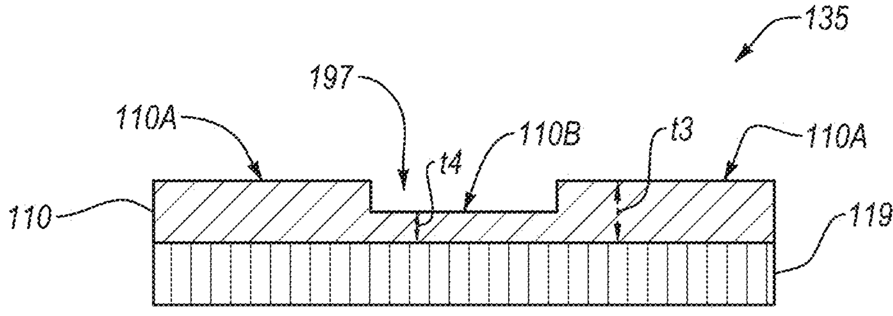
Figure 4C:
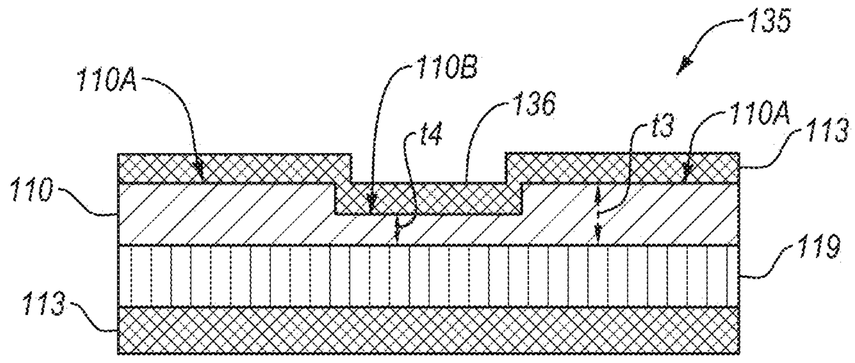
Figure 4D:
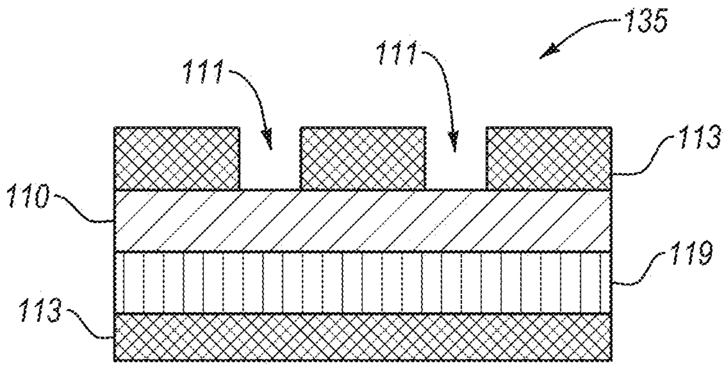
Figure 4E:
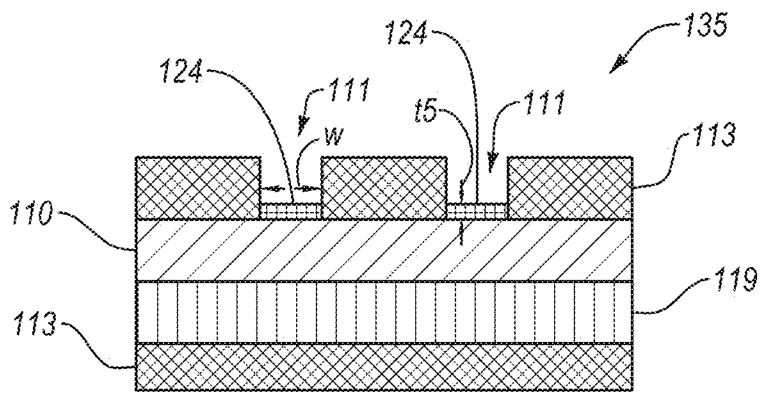
Figure 4F:
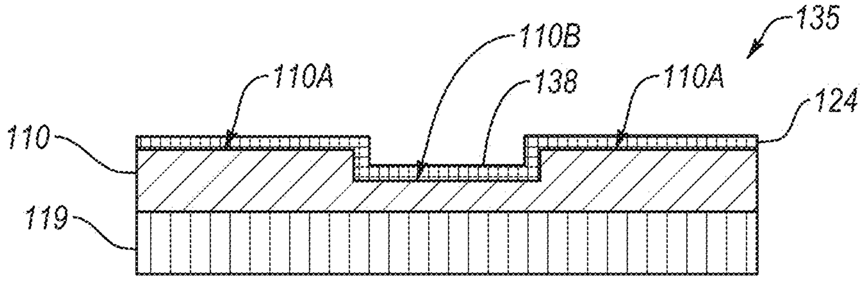
Figure 4G:
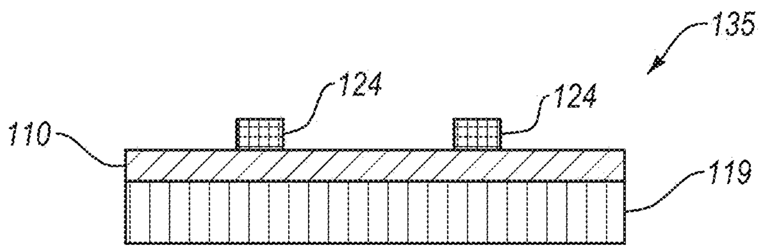
Figure 4H:
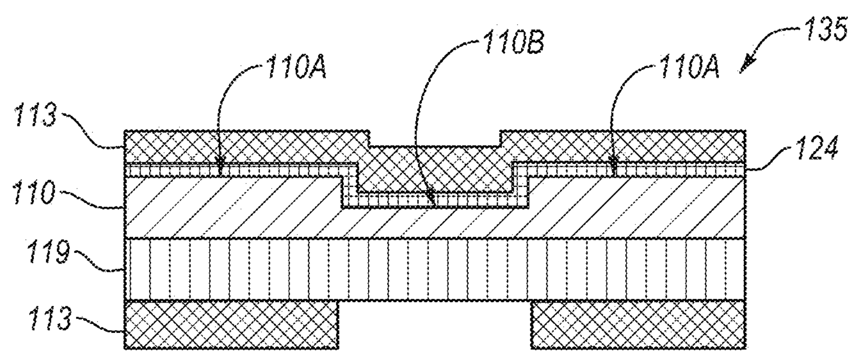
Figure 4I:
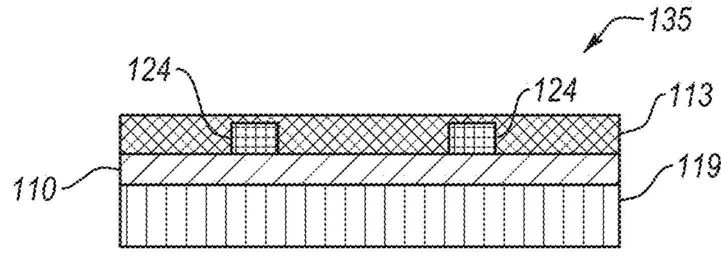
Figure 4J:
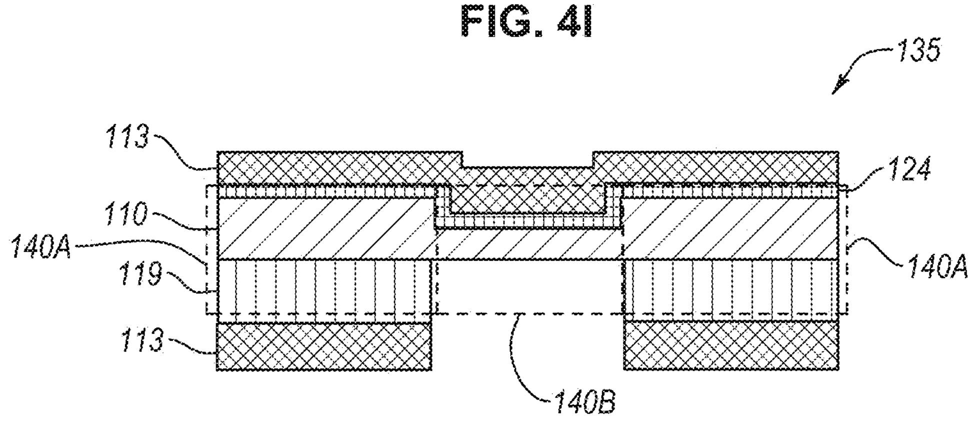
Figure 4K:
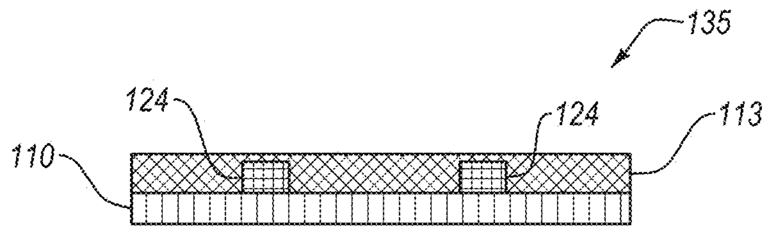
Figure 4L:
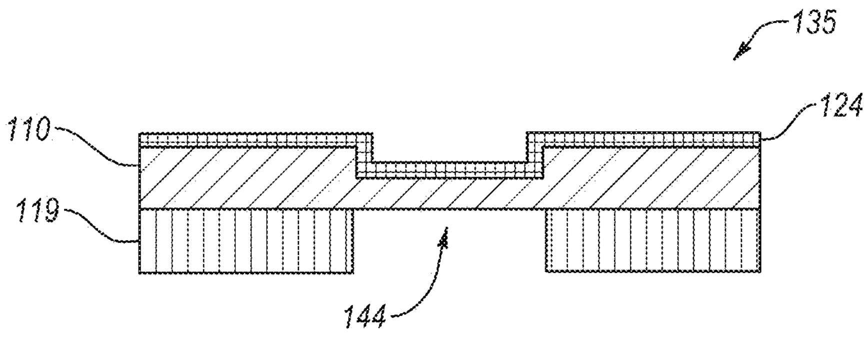
Figure 4M:
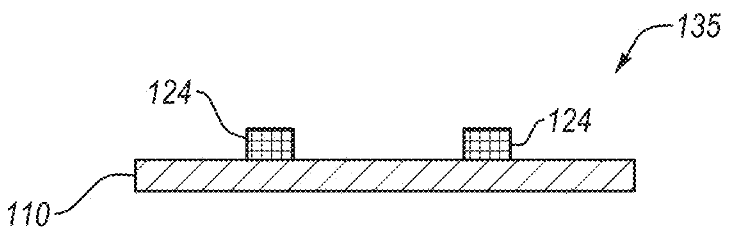
Figure 4N:
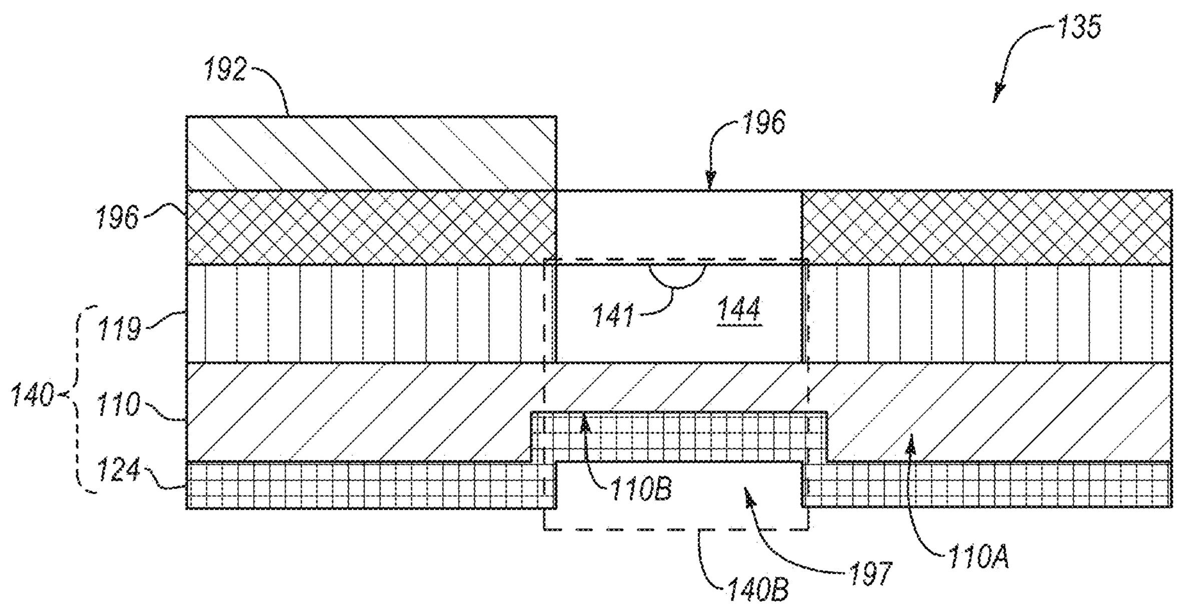
Figure 4O:
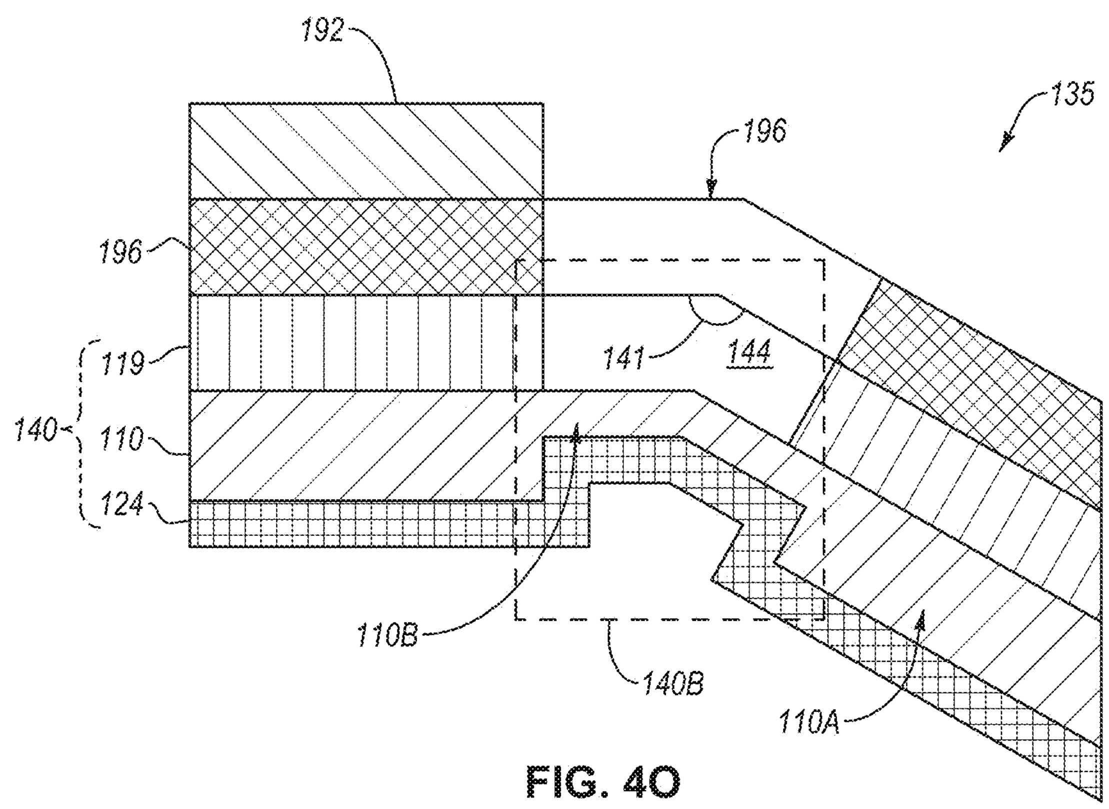

As shown in FIGS. 4A and 4O, the suspension assembly 135 includes a flexure 140 designed to reduce stress in the hinge portion 140B, or the portion that overlaps the hinge 141. The flexure 140 is a multi-layer flexure including, for example, a first layer 119, a second layer 110, and a third layer 124. As will be described herein, portions of various layers 119, 110, and/or 124 have various thicknesses in order to minimize stress in the hinge portion 140B.

The method 300 includes a first step 340 of forming a first layer (i.e., layer 119 in FIGS. 4A-M) of a flexure 140. In some examples, the first layer 119 is formed directly onto the load beam 196. Similarly to the load beam 196, the first layer 119 is often made of stainless steel or other similar materials, and has a thickness that is greater than other layers of the multi-layer flexure 140. In some examples, the first layer 119 is made of a metallic material. For instance, the first layer 119 is a sheet of stainless steel, in some examples. According to some examples, the first layer 119 has a thickness (t2 as illustrated in FIG. 5A) of approximately 20 micrometers ("μm"). In some examples, after the multi-layer flexure 140 is formed, the first layer 119 is attached to the load beam 196 to attach the overall flexure 140 to the load beam. In other words, the first layer 119 is positioned directly adjacent to the load beam 196.

Because the first layer 119 is often made of stainless steel or other metallic materials, with a relatively high thickness, it is preferable, in some examples, that the first layer 119 not extend over the hinge 141 to avoid exerting increased downward pressure on the carriage arm 105 (e.g., on the head 134) when the carriage arm 105 (and, hence, the load beam 196) is in position to hover over the disks 115. Avoiding the exertion of increased pressure helps prevent a shift in the flying height. Thus, as shown in FIG. 5A, there is a gap 144 in the first layer 119. The gap 144 is substantially aligned with the hinge area 140B and thus with the hinge 141. Additionally, the gap is substantially aligned with the hinge portion 110B of the second layer 110, which has a reduced thickness t4 in comparison to the thickness t3 of the non-hinged portion 110A of the second layer 110 in order to accommodate bending about the hinge 141, as illustrated in FIG. 5B.

The second layer 110 of the flexure 140 is formed (e.g. applied) onto the first layer 119 (i.e., step 342 in FIG. 3). In some examples, the second layer 110 is made of a dielectric and/or photosensitive material, such as a liquid polyimide. As illustrated in FIG. 5A, the second flexure layer 110 forms a barrier between the first layer 119 and a third layer 124. This is important for maintenance of signal quality. The thickness of the second layer 110 is positively correlated with signal quality. However, a second layer 110 that is too thick in the hinge area 140B can cause tension in the hinge area 140B. This tension contributes to a spring force of the hinge 141 on the carriage arm 105, thus causing shifts in the flying height between the read/write head 134 and the top surface 116 of the disk 115. Therefore, although removing the first layer 119 from the hinge portion 140B may reduce stress in the hinge portion 140B, reducing the thickness t4 of the hinge portion 110B of the second layer 110 can further reduce this stress. As such, examples of the present disclosure reduce tension in the hinge area 140B, thereby reducing shifts in the flying height.

After the second layer 110 is formed onto the first layer 119, a mask (e.g., mask 120 of FIG. 4A) is placed over the second layer 110 (step 344 of FIG. 3). Although the phrase "placed over" is used herein, examples of the present disclosure are not so limited. For example, the mask 120 can be formed onto the second layer 110. This mask 120 includes a portion 120B that is positioned over the hinge portion 140B of the flexure 140. This portion 120B differs in translucency from a remaining portion 120A of the mask 120. The portion 120B is substantially aligned with the hinge portion 140B. In some examples, portion 120B is more translucent than portion 120A. In some examples, the mask 120 is a glass photomask and/or a halftone mask. For example, the hinge portion 120B of the mask 120 is a halftone glass mask, and the remaining portion(s) 120A of the mask 120 are full glass masks.

In some examples, the mask 120 is an opaque plate having one or more apertures, or transparent or translucent portions. Thus, light may be shined through the mask 120. In some examples, the portion 120B aligned with the hinge portion 140B is more translucent than the remaining portion(s) 120A. In other words, portion 120B is aligned with a portion 110B of the second layer 110 for which a lesser thickness (e.g., t4 of FIG. 5A) is desired. In some examples, the greater translucency of the mask 120 in the portion 120B is due to the translucency of the material used to form the portion 120B is higher than that used to form the remaining portion(s) 120A. In some examples, the greater translucency is attributed at least partially to a greater number and/or concentration of apertures and/or transparent portions in portion 120B.

As indicated at step 346 in FIG. 3, light is irradiated through the mask 120. Light is irradiated through both a hinge portion 120B and a fixed portion 120A of the mask 120. In some examples, this is done through a lens. Although the portion 120B is more translucent than the remaining portion 120A, light may still be irradiated through the entire mask 120.

The mask 120 is then removed from the second layer 110. The next step 348 involves etching away or removing residue from the second layer 110 such that a hinge portion 110B of the second layer has a thickness t4 that is less than a thickness t3 of a remaining, non-hinge portion 110A of the second layer 110. The non-hinge portion 110A may also be referred to herein as a "fixed portion."

Such an example is illustrated in FIG. 4B. Irradiating light through the mask 120 allows for portions of the hinge portion 110B to be more easily removed afterwards. Thus, use of the mask 120 allows for the thickness of the hinge portion 110B to be reduced through a less intensive process.

In some examples, the thickness t3 is approximately twice the thickness t4. For example, the non-hinged portion 110A has a thickness t3 of ten micrometers ("μm") and the etched hinge portion 110B has a thickness t4 of five μm. However, examples of the present disclosure are not so limited. In some examples, the thickness t3 of the etched portion 110B is between thirty and seventy percent of the thickness t4 of the remaining, non-hinged portions 110A. The difference in thicknesses t3 and t4 creates an indentation 197 in the second layer 110.

In some examples, as a result of the different translucencies, the hinge portion 110B is substantially aligned with the portion 120B of the mask 120 with the greater translucency, and the non-hinge portions 110A are substantially aligned with the remaining portion(s) 120A of the mask 120 with the lesser translucency.

As illustrated in FIG. 4C, in some examples, a photoresist material 113 is formed onto the second layer 110. For example, photoresist material 113 is a dry film photoresist. In some examples, the photoresist material 113 is formed onto the second layer 110 by first attaching a layer of photoresist material 113 to the second layer 110 and then forming that layer of photoresist material 113 through a mask. In some examples, the mask is similar to the mask 120 used to form the different thicknesses t3 and t4 of the second layer 110, as shown in FIG. 4A.

The photoresist material 113 is also formed onto the first layer 119, on a side that does not contact the second layer 110. The photoresist material 113 is formed onto the layers 110 and 119 of the flexure by first attaching the photoresist material 113. Although not illustrated in FIG. 4C, in some examples, the photo resist material 113 is then formed onto the layers 119 and 110 by irradiating ultraviolet ("UV") light through a patterned glass mask. Layers of the photoresist material 113 may be referred to herein as a "fourth layer", "fifth layer", "sixth layer", and/or "seventh layer" of the flexure 140. However, as will be described herein, in some examples, the process of forming the multi-layer flexure 140 involves removing one or more layers of the photoresist material 113 after it has served its purpose (i.e., after a portion of a corresponding layer 110, 119 of the flexure has been removed).

As illustrated in FIG. 4D, one or more openings 111 are etched into the photoresist material 113. FIG. 4D illustrates a cross-section of the suspension assembly 135 in a plane that is perpendicular to the plane of the cross-section illustrated in FIG. 4C. As illustrated in FIG. 4D, the one or more openings 111 may expose portions of the second layer 110, which is the layer onto which the photoresist material 113 that is etched is formed.

As illustrated in FIG. 4E, in some examples, an additional, third layer is added to the flexure 140. As illustrated in FIG. 4J, each of the fixed portions 140A of the flexure 140 includes the third layer 124. In some examples, only the fixed portions 140A include the third layer 124. In other examples, both the fixed portions 140A and the hinge portion 140B include the third layer. In those examples, the third layer 124 is made of a material that is relatively soft and does not create undue tension in the hinge 141 as the material of the first layer 119 (e.g., stainless steel) would.

For this reason, the third layer 124 could be included in the hinge portion 140B without creating shifts in the flying height of the read/write head 134.

In some examples, the third layer (e.g., layer 124 illustrated in FIGS. 4E-4M and 5A-B) is made of copper. In some examples, the copper of the third layer 124 is of a high purity, making it less stiff and more flexible. For example, the third layer 124 includes copper with a purity of over ninety-nine percent, or similar to the purity of electronic-grade copper foil.

As illustrated in FIG. 4E, in some examples, the third layer 124 is formed onto the second layer 110 by depositing material intended to form the third layer 124 into the openings 111 of the photoresist 113. For example, material is deposited into the openings 111 until enough material is deposited to form a third layer 124 that has a thickness t5 (FIG. 4E) of approximately six micrometers ("μm"). As illustrated in FIGS. 4E-5B, the second layer 110 is interposed between the first layer 119 and the third layer 124. In some examples, the thickness t5 of the third layer 124 is greater than the thickness t4 of the hinge portion 110B of the second layer 110 but less than the thickness t2 of the first layer 119. In other examples, the thickness t5 of the third layer 124 is substantially equal to the thickness t3 of the non-hinge portions 110A of the second layer 110 but still less than the thickness t2 of the first layer 119. In other examples, each of the thicknesses t2, t3, and t5 are approximately equal, and the thickness t4 is less than any of the thicknesses t2, t3, and t5.

In some examples, the third layer 124 is portions of one or more signal traces for the flexure 140. In some examples, the flexure 140 includes a signal trace (sometimes referred to as a "circuit trace") to conduct signals from the read/write head 134 to other components of the device 100. Although this trace is often made of copper and/or copper foil, examples of the present disclosure are not so limited. For example, in some examples, a trace is made of aluminum, gold, or any combination thereof. The width w of the openings 111 is equal to a desired width w of a trace of the flexure 140. The number of openings 111 is the desired number of copper traces for the flexure 140. For example, two openings 111, as illustrated in FIGS. 4D and 4E, are used to form two traces onto the flexure 140.

Although not illustrated herein, in some examples, a cross-section of the suspension assembly 135 that is perpendicular to the cross-section illustrated in FIG. 4E may appear similar to the cross-section illustrated in FIG. 4C, which includes a bottom layer of photoresist material 113, a first layer 119 of the flexure, a second layer 110 of the flexure with varied thicknesses, and a top layer of the photoresist material 113. In some examples, the top layer of the photoresist material 113 is substantially uniform in thickness but includes an indentation 136 that fills in the difference in thicknesses between the hinge portion 110B of the second layer 110 that has the lesser thickness t4 and the portions 110A that have the greater thicknesses t3.

The photoresist material 113 is removed from the flexure 140. In some examples, this is done through a chemical wash. After the photoresist material 113 is removed, the flexure includes a first layer 119, a second layer 110, and a third layer 124, as illustrated in FIG. 4F. The second layer 110 includes a hinge portion 110B with a thickness that is less than the non-hinge portions 110A and also less than the thickness of the first layer 119. The third layer 124 is substantially uniform in thickness and includes an indentation 138 since it is adjacent to the second layer 110.

FIG. 4G is a cross-sectional view of a suspension assembly 135 at the stage illustrated in FIG. 4F, wherein the plane of the view of FIG. 4G is perpendicular to the plane of the view of FIG. 4F. As illustrated in FIG. 4F, in some examples, the suspension assembly 135 includes two copper traces 124.

At this stage, portions of the first layer 119 still need to be removed to ensure that the hinge portion 140B of the flexure 140 does not include any of the stiff material of the first layer 119. Thus, as illustrated in FIG. 4H, more photoresist material 113 is attached to the flexure 140 to enable removal of portions of the first layer 119. In some examples, the photoresist material 113 is deposited over the third layer 124. However, examples of the present disclosure are not so limited. For example, in some implementations, the photoresist material 113 is only formed onto certain portions of the first layer 119.

As illustrated in FIG. 4H, the photoresist material 113 is formed onto the portions of the first layer 119 that are not to be removed to accommodate the hinge area 140B. In other words, the photoresist material 113 is attached to the portions of the first layer 119 that do not intersect or overlap with the hinge portion 140B when the flexure 140 is laid onto the load beam 196.

FIG. 4I is a cross-section of the suspension assembly 135 at the stage illustrated in FIG. 4H. However, the cross-section of FIG. 4I is perpendicular to the cross-section illustrated in FIG. 4H. The cross-section of FIG. 4I is within the portion 110B of the second layer 110 that will be substantially aligned with the hinge portion 140B of the flexure 140. As such, only the photoresist 113 covering the layers 124 (which, in some examples, are traces) is shown in FIG. 4I.

As illustrated in FIG. 4J, portions of the first layer 119 are removed such that the hinge portion 140B does not include any of the first layer 119. In other words, all of the first layer 119 of the hinge portion 140B is removed. The photoresist 113 functions to keep some portions of the second layer 110 in place while the other portions are removed. In some examples, the removal is accomplished through etching.

FIG. 4K illustrates a cross-section view of a suspension assembly 135 within the hinge area 140B of the flexure 140. The cross-section illustrated in FIG. 4K is perpendicular to the cross-section illustrated in FIG. 4J. As illustrated in FIG. 4K, the only portions of the flexure 140 included in the hinge portion 140B are the portion 110B of the second layer 110 and the third layer(s) 124 (or traces). To illustrate examples in which a photoresist material 113 is also applied to a top of the second layer 110 while the portions of the first layer 119 are being removed, the photoresist material 113 is also illustrated in FIG. 4K.

As illustrated in FIG. 4L, the photoresist material 113 is then removed. In some examples, this is done through a chemical wash, as was described in connection with FIG. 4F.

FIG. 4M illustrates a cross-section view of a suspension assembly 135 within the hinge area 140B of the flexure 140. The cross-section illustrated in FIG. 4M is perpendicular to the cross-section illustrated in FIG. 4L in the gap 144 of the first layer 119.

FIG. 4N illustrates a cross-section of the assembly 135, intersecting the hinge portion 140B in the gap 199 of the load beam 196 illustrated in FIG. 2. As illustrated in FIG. 4N, a final step of the method includes affixing the flexure 140 to a base plate 192 and the load beam 196 such that the portion 110B of the second layer spans the hinge portion 141 of the load beam 196. For example, the load beam 196 is affixed to the sides of the first layers 119 that are opposite the second layer 110.

In the example illustrated in FIG. 4N, the assembly 135 is in a straight, unbent position. The hinge 141 is shown in FIG. 4N. In some examples, the hinge 141 is positioned on one or more sides of the gap 199 in the load beam 196 shown in FIG. 2.

The flexure 140 is attached to and co-movable with the base plate 192 and the load beam 196. The first layer 119, the second layer 110, and the third layer 124 of the flexure 140 are arranged in a stacked formation. The second layer 110 is interposed between the first layer 119 and the third layer 124. The flexure 140 includes a hinge portion 140B, which overlaps the hinge 141 of the load beam. The flexure 140 also includes fixed portions 140A adjacent to the hinge portion 140B. Each of the fixed portions 140A of the flexure 140 include the first layer(s) 119 and the second layer 110. The first layer(s) 119 are interposed between the second layer 110 and the load beam 196.

Because the second layer 110 is formed from a material, such as a liquid polyimide, that allows it to bend around the hinge 141, the hinge portion 140B of the flexure includes the hinge portion 110B of the second layer 110. However, the hinge portion 140B does not include the first layer 119, allowing the first layer 119 to be formed from a material with higher stiffness. In addition to a lower degree of stiffness in the material of the second layer 110 in comparison to the material of the first layer 119, the reduced thickness t4 of the hinge portion 110B in comparison to the thickness t3 of the non-hinge portion(s) 110A of the second layers 110 reduces tension in the hinge area 140B, minimizing flying height shift. In some examples, a ratio of t3 to t4 is greater than 1 and no more than 2.4. For example, if t4 is 5 μm and t3 is approximately 10 μm, the ratio of t3 to t4 is 2.

The first layer 119 has a uniform thickness t2 and a gap 144 throughout the hinge portion 140B. Hence, the hinge portion 140B includes the second layer 110 (e.g., portion 110B of the second layer) but does not include the first layer 119. In some examples, the hinge portion 140B also includes at least a portion of the third layer 124. The load beam 196 also has a substantially uniform thickness t1, at least along the hinge 141. The second layer 110 of the flexure 140 has two portions, 110A and 110B, that each have different thicknesses. The portion 110B that overlaps the gap 144 and the hinge 141 (and is part of the hinge portion 140B of the flexure 140) has a thickness t4 that is less than a thickness t3 of the portion 110A that does not overlap with it. The third layer 124 has a uniform thickness t5.

In FIG. 4O, the flexure 140 and the load beam 196 of FIG. 4N are bent around the hinge 141 to move relative to the base plate 192. As such, the distal end portion (e.g., portion 133 shown in FIG. 2) of the load beam 196 moves relative to the base plate 192. When the load beam 196 is bent as shown in FIG. 4O, it is bent towards the surface 116 of at least one disk (e.g., disks 115 shown in FIG. 1), minimizing the flying height between the read/write head 134 of the distal end portion 133 and the surface 116. For example, if the disks 115 are positioned below the load beam 196, bending the load beam 196 and flexure 140 about the hinge 141 brings the distal end portion 133 closer to the surface of 116 of the disk 115.

Although FIGS. 4N and 4O illustrate a third layer 124 that is part of both the fixed portions 140A and the hinge portions 140B (i.e., runs along the entire second layer 110), examples of the present disclosure are not so limited. Some examples include a gap in the third layer 124, similar to the gap 144 in the first layer 119. In such examples, only the fixed portions 140A include the third layer 124; the hinge portion 140B does not.

FIGS. 4N and 4O illustrate a gap 144 in the first layer 119 and an indentation 197 in the second layer 110 and the third layer 124. The indentation 197 is attributed to: (1) the differences in thicknesses t3 and t4 between the non-hinge portions 110A and the hinge portions 110B, respectively, of the second layer; (2) the hinge portion 110B being formed by removing material of the second layer 110 on the side that is opposite of the side of the second layer 110 that contacts the first layer 119 (as illustrated in FIG. 4B) and (3) the third layer 124 being formed directly onto the indentation 197 of the second layer 110 (e.g., indentation 197 shown in FIG. 4B). In other words, the second portion 110B is open toward the third layer 124.

However, examples of the present disclosure are not so limited. FIGS. 5A and 5B are cross-sectional views of a suspension assembly 135 of a magnetic storage device 100 perpendicular to the hinge 141 in the gap of the load beam 196 (e.g., gap 199 in FIG. 2), according to one or more examples of the present disclosure. As illustrated in FIGS. 5A-B, material of the second layer 110 may be removed from a side of the second layer that faces the first layer 119. As such, the side of the second layer 110 onto which the third layer 124 is formed is relatively flat, so there is no indentation 197 in that side of the second layer 100 or in the third layer 124. The second portion 110B defines an indentation that is open toward the gap 144 rather than toward the third layer 124.

FIG. 5A shows the suspension assembly 135 in a straight, unbent position. FIG. 5B is a cross-sectional view of the suspension assembly 135 of FIG. 5A, with the flexure 140 and the load beam 196 bent slightly around a hinge 141, which is interposed between the distal end portion (e.g., distal end portion 133 shown in FIG. 2) and the base plate 192.

The portion 110B may be referred to herein as the "second layer of the hinge portion 140B." The portions 110A, which have a thickness of t3 in FIG. 5B, may be referred to as the "second layer of the fixed portions 140A."

As used herein, the term "layers" may be used to describe multiple consecutive or non-consecutive layers. However, it may also be used to describe multiple portions of a layer of material. For example, as shown in FIG. 5A, the second layer 110 includes multiple portions with different thicknesses, including portions 110A and 110B. Portions 110A and 110B may be referred to collectively as "second layers 110" and/or as "the second layer 110." Additionally, portions 110A may be referred to as the "second layers of the fixed portion 140A of the flexure."

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an,"

and "the" also refer to "one or more" unless expressly specified otherwise. Further, the term "plurality" can be defined as "at least two."

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. A method of manufacturing a suspension assembly of a magnetic storage device, the method comprising:

forming a second layer onto a first layer;

applying a mask onto the second layer, wherein a translucency of a first portion of the mask differs from a translucency of a second portion of the mask;

irradiating light through the first portion and the second portion of the mask;

removing the mask from the second layer; and etching the second layer so that a first portion of the second layer, onto which the first portion of the mask was applied, has a first thickness, and a second portion of the second layer, onto which the second portion of the mask was applied, has a second thickness, wherein the second thickness is less than the first thickness.

2. The method of claim 1, wherein the first layer is formed directly onto a load beam of the suspension assembly.

3. The method of claim 1, wherein the first layer is made of a metallic material.

4. The method of claim 1, further comprising:

forming a fourth layer onto the second layer;

forming a fifth layer onto the first layer;

forming a third layer onto the second layer through an opening in the fourth layer; and removing the fourth layer and the fifth layer through a chemical wash.

5. The method of claim 4, wherein the fourth layer and the fifth layer are made of a photoresist material.

6. The method of claim 4, wherein:

the first layer is made of stainless steel;

the second layer is made of a polyimide material;

the third layer is made of copper; and each one of the fourth layer and the fifth layer is made of dry film photoresist.

7. The method of claim 4, further comprising:

forming a sixth layer onto the third layer after removing the fourth layer;

forming a seventh layer onto the first layer after removing the fifth layer;

removing a portion of the first layer, exposed through an opening in the seventh layer, so that a portion of the second layer is exposed through the opening in the seventh layer, wherein the portion of the second layer exposed through the opening in the seventh layer is aligned with the second portion of the second layer having the second thickness; and removing the sixth layer and the seventh layer.

8. The method of claim 7, wherein the sixth layer and the seventh layer are made of a photoresist material.

9. The method of claim 7, wherein:

the first layer is made of stainless steel;

the second layer is made of a polyimide material;

the third layer is made of copper; and each one of the fourth layer, the fifth layer, the sixth layer, and the seventh layer is made of dry film photoresist.

10. The method of claim 4, wherein the third layer is made of copper.

11. The method of claim 10, wherein the third layer forms at least one signal trace of the suspension assembly.

12. The method of claim 1, wherein:

the first portion of the mask is a full glass mask; and the second portion of the mask is a halftone glass mask.

13. The method of claim 1, wherein:

the mask is an opaque mask; and the second portion of the mask corresponds with one or more of an aperture, a transparent portion, or a translucent portion of the opaque mask.

14. The method of claim 1, wherein:

the first layer and the second layer form a portion of a flexure of the suspension assembly; and the method further comprises affixing the flexure to a base plate and a load beam of the suspension assembly such that the second portion of the second layer spans a hinge portion of the load beam.

15. A method of manufacturing a hard disk drive, the method comprising:

providing a base plate and a load beam;

forming a first layer directly to the load beam;

forming a flexure by:

forming a second layer onto the first layer;

applying a mask onto the second layer, wherein a translucency of a first portion of the mask differs from a translucency of a second portion of the mask;

irradiating light through the first portion and the second portion of the mask;

removing the mask from the second layer; and etching the second layer so that a first portion of the second layer, onto which the first portion of the mask was applied, has a first thickness, and a second portion of the second layer, onto which the second portion of the mask was applied, has a second thickness, wherein the second thickness is less than the first thickness;

installing the base plate, the load beam, and the flexure into a housing; and sealing the housing.

16. The method of claim 15, further comprising applying the mask over a hinge portion of the load beam.

17. The method of claim 15, further comprising:

forming a fourth layer onto the second layer;

forming a fifth layer onto the first layer;

forming a third layer onto the second layer through an opening in the fourth layer; and removing the fourth layer and the fifth layer through a chemical wash.

18. The method of claim 17, further comprising:

forming a sixth layer onto the third layer after removing the fourth layer;

forming a seventh layer below the first layer after removing the fifth layer;

removing a portion of the first layer, exposed through an opening in the seventh layer, so that a portion of the second layer is exposed through the opening in the seventh layer; and removing the sixth layer and the seventh layer.

19. The method of claim 18, wherein the portion of the second layer exposed through the opening in the seventh layer is aligned with a hinge portion of the load beam.

20. A method for manufacturing a flexure of a suspension assembly of a magnetic storage device, the method comprising:

a step for forming a second layer onto a first layer;

a step for applying a mask onto the second layer, wherein a translucency of a first portion of the mask differs from a translucency of a second portion of the mask;

a step for irradiating light through the first portion and the second portion of the mask;

a step for removing the mask from the second layer; and a step for etching the second layer so that a first portion of the second layer, onto which the first portion of the mask was applied, has a first thickness, and a second portion of the second layer, onto which the second portion of the mask was applied, has a second thickness, wherein the second thickness is less than the first thickness.

* * * * *